Figure 1:
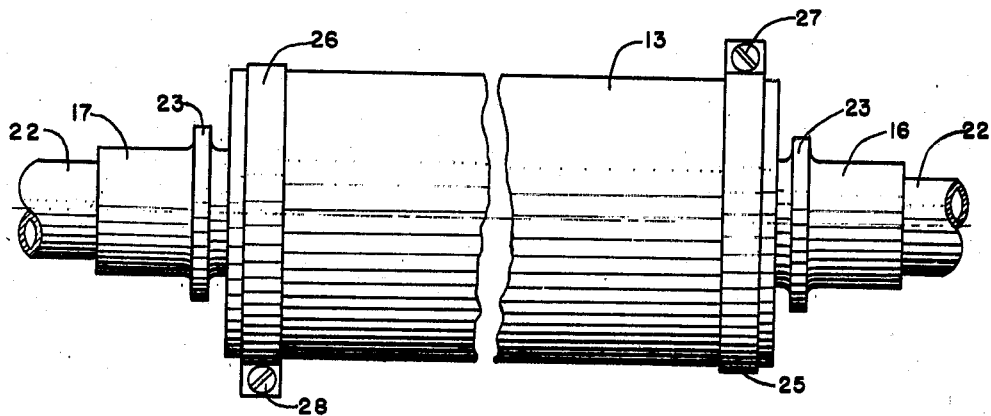
Figure 2:
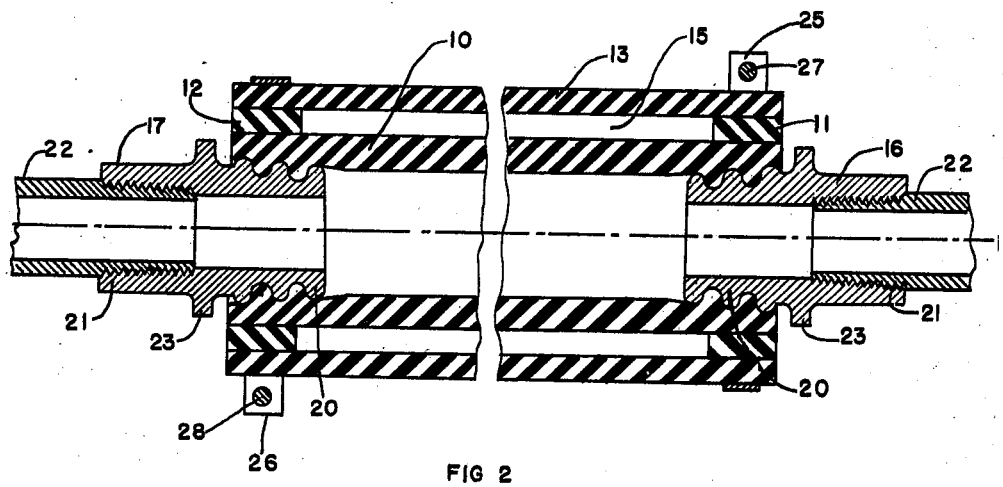

Nov. 11, 1941.  R. H. BEACH  2,261,948

PIPE LINE NOISE ELIMINATOR

Filed April 30, 1940

INVENTOR.
RALPH H. BEACH
BY
ATTORNEY.

Patented Nov. 11, 1941

2,261,948

UNITED STATES PATENT OFFICE 2,261,948

PIPE LINE NOISE ELIMINATOR

Ralph H. Beach, Rockdale, Md., assignor to Gerotor May Company, a corporation of Delaware Application April 30, 1940, Serial No. 332,618

2 Claims. (Cl. 285—90)

The invention relates to a sound deadening and inhibiting device against transmission of sound in fluid passageways and particularly to the prevention of the transmission of pulsating noises in liquid pipe lines where liquid is stored in and drawn from metal tanks which have a tendency to vibrate with the pump pulsations.

Vibration caused by water pump operation creates noises in the storage tank or in the air cushioning device connected with the domestic water supply system and such noises are frequently of an objectionable character. The same condition exists in oil pump lines and is particularly objectionable in domestic oil burner installations where the oil is stored within the house.

An object of the invention is to interpose a sound deadening connector section in the liquid passageway between the pump and the liquid reservoir. Another object is to provide a reinforced, resilient sound deadening section for a fluid passageway in which the pulsations in the passageway are transmitted through the resilient section and absorbed thereby, so that the noise and pulsation are suppressed.

An embodiment of the invention is shown in the accompanying drawing in which:

Fig. I is an elevational view of the improved sound deadening device with end connections for attachment to a pipe line.

Fig. II is a view in section along a median line of the device shown in Fig. I.

In the preferred form of the invention as illustrated in the drawing, the sound deadening device comprises an inner elastic material member into which are inserted two end members provided with suitable connection portions for attachment to the elastic member and also to a pipe line. A separator or distance piece is positioned near each end of the elastic member and surrounding it at the ends where the end members are inserted. An outer enclosing member, also of elastic material but of a somewhat stronger and less elastic material than the inner member, surrounds the inner member and is maintained in spaced relation to it by the separator pieces so that a hermetically tight air chamber is maintained between the inner and outer members and the separator pieces. The whole assembly, including the end members, is bound together by means of clamps which fit over the ends of the outer member and these clamps when tightened, fix all of the parts together so as to be liquid and air tight.

As shown in the drawing, the inner elastic member 10, preferably of a comparatively elastic rubber material or of a like substance, resilient to the liquid passing through the passageway, which elastic material yields more or less as pulsation or pressure fluctuations occur and in a measure to suit the force of the pulsation. The separator pieces 11 and 12 are also of elastic material fitting tightly over the ends of the elastic member 10, the length of these separators being short in comparison with the member 10. The outer enclosing member 13 is preferably of a reinforced rubber or like material somewhat more rigid and stronger than the inner member 10. The reinforcing material may be cloth in layers, wire gauze, metal sheathing, or like material. The outer member 13 is coextensive with the inner member 10 and is maintained in its spaced relation with the inner member by the separator pieces which it contacts tightly so that an air space 15 is provided between the inner and outer members.

The end members 16 and 17 are provided at one end with a corrugated portion 20 which is forced into the elastic inner member 10 and at the other end with a threaded portion 21 whereby the device is attached to the pipe line 22. A shoulder 23 facilitates positioning of the end member and holds it in suitable relation to the other parts. The end members, inner and outer members, and separator pieces are all held together in liquid tight and air tight relation by means of the metal clamps 25 and 26 which are tightened in place by means of screws 27 and 28.

The air space 15 is maintained between the inner and outer members and is of such size which may be governed by the thickness of the separator pieces to permit expansion and contraction of the inner member to a degree sufficient to compress the air in the space between the inner and outer members, thereby acting as a cushion to deaden the vibration noise in the pipe line and to prevent the transmission of sound. In the case of sudden or of high pressure in the pipe line, the stronger, more rigid outer member supports and supplements the inner member, preventing rupture or undue expansion.

Although I have shown and described the invention as applied to water or oil pipe lines, it is adapted for use with any fluid pressure line and it is understood that the invention may be modified in various ways, as for instance, the substitution of a non-resilient material for the outer member with suitable separators without departing from the spirit or scope of the invention as set forth herein and as claimed.

What is claimed and desired to be secured by Letters Patent of the United States is:

1. Means for absorbing sound vibration incidental to the operation of a pump adapted to be interposed in a pipe line leading from said pump to a storage reservoir said means comprising an inner vibration cushioning material tube, an outer surrounding sleeve of similar material, means for spacing said tube and said sleeve to form a hermetically sealed air space therebetween and connection means for interposing said sound vibration absorption means in fluid tight relation in said pipe line.

2. Means for absorbing sound vibration incidental to the operation of a liquid pump adapted to be interposed in a pipe line leading from said pump to a storage reservoir said means comprising an inner tubular passageway of resilient rubber material an outer surrounding sleeve of similar material, spacing means between said inner and outer members whereby a hermetically sealed space is formed therebetween, and connection means for interposing said sound vibration adsorption means in fluid tight relation in said pipe line to form a continuous passageway between said pump and said storage reservoir.

RALPH H. BEACH.